United States Patent
Bradford et al.

(10) Patent No.: US 7,288,577 B1
(45) Date of Patent: Oct. 30, 2007

(54) POLYURETHANE FOAM CONTAINING FLAME RETARDANT BLEND OF NON-OLIGOMERIC AND OLIGOMERIC FLAME RETARDANTS

(75) Inventors: Larry L. Bradford, Danbury, CT (US); Emanuel Pinzoni, Hawthorne, NJ (US); Barbara A. Williams, New York, NY (US); Theodore Halchak, Upper Montclair, NJ (US)

(73) Assignee: Supresta U.S. LLC, Ardsley, NY (US)

( * ) Notice: Subject to any disclaimer, the term of this patent is extended or adjusted under 35 U.S.C. 154(b) by 0 days.

(21) Appl. No.: 09/392,434

(22) Filed: Sep. 9, 1999

(51) Int. Cl.
   C08J 9/04     (2006.01)
   C08K 5/521    (2006.01)
   C08K 5/523    (2006.01)

(52) U.S. Cl. .............. 521/107; 521/108; 521/155; 521/168; 521/169; 521/170; 521/906

(58) Field of Classification Search ............. 521/107, 521/108, 155, 168, 169, 170, 906
See application file for complete search history.

(56) References Cited

U.S. PATENT DOCUMENTS

| | | | | |
|---|---|---|---|---|
| 3,891,727 A | * | 6/1975 | Weil ..................... | 558/87 |
| 3,956,200 A | | 5/1976 | Biranowski ............ | 521/108 |
| 4,199,534 A | * | 4/1980 | Fearing ................. | 558/114 |
| 4,268,633 A | * | 5/1981 | Fearing ................. | 521/168 |
| 4,273,881 A | | 6/1981 | Otten .................... | 521/108 |
| 4,382,042 A | * | 5/1983 | Hardy et al. .......... | 558/115 |
| 4,458,035 A | * | 7/1984 | Hardy et al. .......... | 521/107 |
| 5,608,100 A | * | 3/1997 | Sicken .................. | 558/164 |
| 5,622,999 A | * | 4/1997 | Nagy et al. ........... | 521/106 |
| 5,672,645 A | | 9/1997 | Eckel et al. ........... | 524/127 |
| 5,679,288 A | * | 10/1997 | Kim et al. ............ | 252/609 |
| 5,981,612 A | * | 11/1999 | Keppeler et al. ...... | 521/107 |
| 5,985,965 A | * | 11/1999 | Sicken et al. ......... | 524/127 |

FOREIGN PATENT DOCUMENTS

| | | | |
|---|---|---|---|
| EP | 138204 | * | 4/1985 |
| EP | 255381 | * | 2/1988 |
| EP | 428221 | | 5/1991 |

OTHER PUBLICATIONS

Derwent Patent Abstract 89-260968/36 (1989).
Derwent Patent Abstract 26284A/14 (1978).
Derwent Patent Abstract 88-180149/26 (1988).

* cited by examiner

*Primary Examiner*—Rabon Sergent
(74) *Attorney, Agent, or Firm*—Dilworth & Barrese, LLP

(57) ABSTRACT

A polyurethane foam can be flame retarded by the incorporation therein of a flame retardant blend that comprises: (a) a non-oligomeric non-halogenated organophosphorus flame retardant (e.g., a phosphate ester) that is adapted for use in a polyurethane foam formulation; and (b) an oligomeric organophosphorus flame retardant (e.g., a phosphate ester) having a phosphorus content of no less than about 10%, by weight, and at least three phosphate ester units therein.

1 Claim, No Drawings

POLYURETHANE FOAM CONTAINING FLAME RETARDANT BLEND OF NON-OLIGOMERIC AND OLIGOMERIC FLAME RETARDANTS

BACKGROUND OF THE INVENTION

A wide variety of disclosures exists in regard to flame retardant additives for polymers, such as polyurethane foams. Two representative examples of disclosures of this type, which relate to blends of two differing flame retardant additives, include the following:

U.S. Pat. No. 4,273,881 to J. G. Otten describes the use of a 50:50 mixture of flame retardant A, sold under the trademark ANTIBLAZE 19, and bis-(2-chloroethyl)-2-chloroethyl-phosphonate (See Col. 9, lines 61-62).

U.S. Pat. No. 3,956,200 to J. Biranowski describes the use of flame retardant blends comprising a polyglycol hydrogen polyphosphonate and an additive, non-reactive flame retardant in a ratio of from about 20:1 to 1:1, preferably from about 5:1 to 1:1.

In addition to the foregoing patent disclosures, certain blends of monomeric and oligomeric flame retardants have also been sold to the polyurethane industry, including compositions carrying the trademarks FYROL 25 and FYROL EFF of Akzo Nobel Chemicals Inc. The product sold under the former mark included an oligomer that contained a blend of both phosphate and phosphonate moieties, whereas the product sold under the latter mark contained a major amount (about 66%) of the oligomeric component and a minor (about 32.5%) of the monomeric flame retardant component.

The flame retardant blends that have been previously described all contain halogen.

In addition to the foregoing, U.S. Pat. No. 5,672,645 to T. Eckel et al. describes a flame retardant blend of a monophosphorus compound, which can either be halogen-containing or non-halogenated, and an oligomeric phosphorus compound. This blend is only described for use in aromatic polycarbonate-containing compositions and not in polyurethane foams.

SUMMARY OF THE INVENTION

The present invention relates to polyurethane foam compositions containing a flame retardant blend comprising: (a) a non-oligomeric non-halogenated organophosphorus flame retardant that is adapted for use in a polyurethane foam formulation; and (b) an oligomeric organophosphorus flame retardant having a phosphorus content of no less than about 10%, by weight, and at least three phosphorus atom-containing units therein.

Preferred blends unexpectedly pass performance tests at decreased total phosphorus level as compared to that predicted from the passing performance of the individual blend components. These blends, in some cases, are more cost effective than either one of the blend components.

DESCRIPTION OF THE PREFERRED EMBODIMENTS

The non-oligomeric non-halogenated flame retardant that forms one essential component of the blends that are used in the present invention are those flame retardants additives that have hitherto been used in conferring flame retardancy on polyurethane foams (both flexible and non-flexible polyurethane foams).

One representative class that can be selected include the non-halogenated phosphate esters, having the formula $P(O)(OR)_3$, with R in this formula standing for an alkyl moiety containing from about one to about five carbon atoms or an aryl moiety. Representative additives which may be employed herein include: triphenyl phosphate ("TPP"); propylated or butylated TPP ("PTPP" and "BTPP", respectively); triethyl phosphate ("TEP"); tributyl phosphate ("TBP"); and the like. In addition, a non-monomeric (but non-oligomeric) phosphate containing additive (i.e., a dimer) can be selected for use herein. An example of such a dimer is: resorcinol diphosphate ("RDP").

Another type of organophosphorus additive (a) includes the non-oligomeric phosphonates species wherein one of the groups —OR in the aforementioned phosphates is replaced by the group —R. These compounds have the formula $RP(O)(OR)_2$.

The amount of such additive in the blend will range from about 25% to about 95%, by weight of the blend, more preferably from about 40% to about 70%.

The second component of the blend which is used in accordance with the present invention is an oligomeric organophosphorus flame retardant having a phosphorus content of no less than about 10%, by weight, and, in preferred embodiments when an organophosphate is desired, at least three phosphate ester units therein (i.e., at least two phosphate ester repeat units and a phosphate capping unit). The term "oligomeric" as used herein is meant to exclude either monomeric or dimeric species. The amount of this additive in the blend will range from about 5% to about 75%, by weight of the blend, more preferably from about 30% to about 60%. A representative additive of this type is generally described in U.S. Pat. No. 4,382,042 to T. A. Hardy with the non-halogenated versions being preferred (e.g., especially the ethyl group-containing composition). These preferred organophosphate oligomers can be formed by reacting phosphorus pentoxide with the selected trialkyl phosphate (e.g., triethyl phosphate) to form a polyphosphate ester containing P—O—P bonds that is then reacted with epoxide (e.g., ethylene oxide) to form the desired product. This preferred oligomeric organophosphate flame retardant is of the formula:

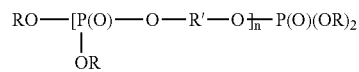

where n (which designates the "repeat" phosphate ester units) can range, on a number average basis, from 2 to about 20, preferably from 2 to about 10, and R is selected from the group consisting of alkyl and hydroxyalkyl and R' is alkylene. The alkyl and alkylene groups will generally contain from about two to about ten carbon atoms.

Especially preferred oligomeric phosphates for use herein will comprise ethyl and ethylene groups as the alkyl and alkylene moieties, will have a hydroxy functionality of no more than about 30 mg KOH/g, will have an acid number of no more than about 2.5 mg KOH/g, and will have a phosphorus content that ranges from about 15% to about 25%, by weight. It is referred to herein after as "PEEOP" (or "poly(ethyl ethyleneoxy)phosphate").

It is within the contemplation of the present invention to utilize oligomeric phosphonate-containing materials as component (b). Both substantially pure phosphonate and phosphonate/phosphate compositions are intended to be included. These have the same structure as depicted above for the oligomeric phosphate species with the exception that the internal (bracketed) RO— on the left side of the structure may be R— and one of the terminal —OR structures on the right side of the formula may be —R. A representative and commercially available example of an additive of this type is FYROL 51 from Akzo Nobel Chemicals Inc. which is made by a multistep process from dimethyl methylphosphonate, phosphorus pentoxide, ethylene glycol, and ethylene oxide.

The foregoing flame retardant blend is, in accordance with the present invention, added to a selected polyurethane foam formulation at from about 2 to about 35 parts by weight of the blend per 100 parts by weight of the polyol that is in the formulation. The weight percent phosphorus that is in the final polyurethane foam formulation will range from about 0.25 wt % to about 3.5 wt %. The foregoing type of flame retardant blend is especially adapted for use in flexible and rigid polyurethane foams and, in certain embodiments (e.g., at ratios of from about 1:1 to about 20:1 of the monomeric additive:oligomeric additive) in typical polyester or polyether polyurethane flexible foams, have shown unexpectedly greater efficiency of the blend as compared to the additive sums of the individual components thereof. This performance is especially attractive since the oligomeric material is typically much more expensive than the monomeric material making cost efficiency of the blend particularly beneficial.

The density of the foam is an important factor. In general, the higher the density, the less flame retardant additive required to pass the flame test. The addition of the blended product is more enhanced with this rule. For example, the primary blend of BTPP and an oligomeric phosphate ester, PEEOP, when at a 1:1 ratio will pass the TB117 test in a 1.0 pound per cubic foot (pcf) density foam at 16 parts per hundred. The same blend will meet the TB117 test in a 1.8 pcf density foam at 5 parts per hundred.

A blend of two phosphorus containing products differing in efficiency (as measured by parts required to pass a given test) can be further compared by, parts of phosphorus required to pass a given test. For blends of these two products it is expected that the phosphorus requirement to pass said test will fall between the two. If less phosphorus is required for the blend than for either individual product, it is clearly synergistic and advantageous. For example (from Data Sets 2 and 3), a monomeric flame retardant (BTPP) requires 1.36% of phosphorus to pass the TB117 test, and an oligomeric organophosphate flame retardant requires 0.95% phosphorus to meet the same test. The blend of the two products in a 1:1 ratio only requires 0.69% phosphorus in a 1.8 pcf density foam.

U.S. Pat. No. 3,956,200 is incorporated herein (see, for example, Col. 6, line 25 to Col. 8, line 15) to illustrate how flexible foams, which are preferred, can be made. However, the flame retardant blend that has been previously described can be used in non-flexible polyurethane foams as well.

The foregoing invention is further illustrated by the Examples and Data Sets that follow.

EXAMPLES

The flame retardant test data that follows in the Data Sets were generated using a typical polyether polyurethane flexible foam that was tested at nominal densities of 1.0, 1.5, and 1.8 pounds per cubic foot (pcf). The formulation used to form the foam was formed using a polyether polyol having a hydroxyl number of 56, a water level of from 3.55% to 5.6%, an amine level of about 0.25%, and an NCO index of 110.

The following standard tests were employed:

A. Cal. TB 117 A Test: This test is a small-scale vertical test with a twelve-second-ignition time. The sample size was 12"×3×½". The ignition source was removed after twelve seconds. A second clock is started if the sample continues to burn. The criteria for failing included: a sample exceeding an individual burn of eight inches or an average burn of six inches. The time criteria required that an individual specimen would not have an individual afterflame or afterglow exceeding ten seconds or an average afterflame or afterglow exceeding five seconds.

B. Cal. TB 117 D Test: This test is a smoldering test in which a cigarette is used as the ignition source under a cotton cloth cover. The foam sample was covered with a standard velvet cotton cloth and was placed in a small wooden frame to form a mock chair. The back of the sample was 8"×7"×2", and the seat was 8"×4"×2". The sample was preweighed before testing and was again weighed after the test was finished. If the foam lost more than 20% of its weight, it was judged to be a failure.

C. MVSS 302 Test: This test is a horizontal flame test that is used as a guideline for automobile manufactures. The sample size was 14"×4"×½". There is a line 1½" from the ignition point. A flame was ignited for fifteen seconds. The ignition source was then turned off and the sample was rated. A "DNI" rating indicates that the sample did not support combustion ("did not ignite"). A rating of "SE" indicates that the sample ignited but did not burn to the timing zone, which is a point starting from the 1½" mark to the 3½" line. A rating of "SENBR" indicates that the sample burned past the 1½" line but was extinguished before the 3½" mark. A rating of "SE/B" indicates that a sample burned past the 3½" mark but was extinguished before the endpoint. An inch per minute rate was then calculated. The burn rate indicates that a sample burned passed the 3½" mark. An indication of a burn rate or an SE/B rating that was higher than 4.0 in/min indicates failure in accordance with this test. For this study a minimum performance of SENBR was required.

A number of flame retardant additives were used in TB-117 and MVSS 302 tests in a variety of foams, either alone or in combination, as further described below. They were: triphenyl phosphate ("TPP"), available under the trademark PHOSFLEX TPP from Akzo Nobel Chemicals Inc.; butylated triphenyl phosphate ("BTPP"), available under the trademark PHOSFLEX 71B from Akzo Nobel Chemicals Inc.; a poly(ethyl ethyleneoxy)phosphate ("PEEOP"), of the type described in copending U.S. Ser. No. 08/677,283, having a molecular weight of about 915 (number average)/1505 (weight average), a typical hydroxyl number of under about 5; and a blend of 50 wt % PHOSFLEX 71B and 50 wt % PEEOP, which is referred to hereinafter as "Blend" in some of the Data Sets that follow.

Data Set 1

The following data illustrates that relative performance of flame retardant additives varies with foam density as well as the test method used. The described blends give unexpected synergism in some of these combinations (as density increases less flame retardant additive is usually required to meet a specific test):

Passing FR Levels* (Data Set 1)

| Product | TB-117 1.0 pcf | TB-117 1.5 pcf | TB-117 1.8 pcf | MVSS 302 1.0 pcf SENBR | MVSS 302 1.5 pcf SENBR | MVSS 302 1.8 pcf SENBR |
|---|---|---|---|---|---|---|
| BTPP | 17 | | 16 | 17 | | 14 |
| BTPP:PEEOP 1:1 | 16 | 10 | 5 | 15 | 8 | 5 |
| PEEOP | 7 | 5 | 5 | 7 | 5 | 4 |
| RDP/PEEOP (1:1) | | 8 | 5 | | 8 | 5 |
| PHOSFLEX 4**:PEEOP (1:1) | | 12 | 7 | | 5 | 5 |
| PHOSFLEX 31 brand***/PEEOP 1:1 | | 9 | 7 | | 7 | 4 |
| TPP/PEEOP 1:1 | | 12 | 7 | | 8 | 4 |

*in parts per hundred (pph) based on 100 parts by weight of polyol used in making the foam.
**PHOSFLEX 4 flame retardant is tributyl phosphate.
***PHOSFLEX 31 flame retardant is propylated triphenyl phosphate.

% Phosphorus Levels (Data Set 2)

| Flame Retardant | % P | TB117 (phr of FR) | % P to pass in foam | MVSS 302 (phr of FR) | % P to pass in foam |
|---|---|---|---|---|---|
| 1.8 pcf Density | | | | | |
| BTPP | 8.5 | 16 | 1.36 | 14 | 1.19 |
| BTPP/PEEOP | 13.8 | 5 | 0.69 | 5 | 0.69 |
| PHOSFLEX 31P/PEEOP | 13.5 | 7 | 0.94 | 4 | 0.54 |
| TPP/PEEOP | 14.3 | 7 | 1.00 | 4 | 0.57 |
| PHOSFLEX 4/PEEOP | 15.4 | 7 | 1.08 | 5 | 0.77 |
| PEEOP | 19 | 5 | 0.95 | 4 | 0.76 |
| RDP/PEEOP | 15 | 5 | 0.75 | 5 | 0.75 |
| 1.5 pcf Density | | | | | |
| BTPP/PEEOP | 13.8 | 10 | 1.38 | 8 | 1.10 |
| PHOSFLEX 31P/PEEOP | 13.5 | 9 | 1.21 | 7 | 0.95 |
| TPP/PEEOP | 14.3 | 12 | 1.72 | 8 | 1.14 |
| PHOSFLEX 4/PEEOP | 15.4 | 12 | 1.85 | 5 | 0.77 |
| RDP/PEEOP | 15 | 8 | 1.2 | 8 | 1.2 |
| 1.0 pcf Density | | | | | |
| BTPP | 8.5 | 17 | 1.45 | 17 | 1.45 |
| BTPP/PEEOP | 13.8 | 16 | 2.21 | 15 | 2.07 |
| PEEOP | 19 | 7 | 1.33 | 7 | 1.33 |

Data Set 2

The following data illustrates the parts per hundred of flame retardant (PEEOP and/or BTPP) needed to actually pass the MVSS 302 test and the TB 117 tests in a 1.5 density foam:

| Flame Retardant | MVSS 302 | TB 117 |
|---|---|---|
| BTPP*:PEEOP (1:1 Wt. Ratio) | 8 | 10 |
| 100% PEEOP | 5 | 5 |

*available from Akzo Nobel Chemicals Inc. under the trademark PHOSFLEX 71B.

The following additional data was obtained:

| SAMPLE ID | Total % P to pass TB117 | Total % P to pass MVSS302 | Density 1.5 (pcf) | Air flow ft³/min |
|---|---|---|---|---|
| BTPP (estimate) | 2.2 | 2.4 | 1.5 | 5 |
| Blend: 1:1 | 1.38 | 1.1 | 1.49 | 5.2 |
| PEEOP (neat) | 0.95 | 0.95 | 1.51 | 5.2 |

From an analysis of all of the foregoing data, a number of conclusions can be reached: Generally speaking, an increase in the density of the foam will reduce the amount of flame retardant that is needed to pass a specific flame retardancy test.

There is a clear advantage to blending the PHOSFLEX 71B brand material with the PEEOP additive in a 1.8 density foam since the BTPP/PEEOP additives passes the TB 117 and MVSS 302 test at 5 parts.

Data Set 3

The following data illustrates the parts per hundred of flame retardant (PEEOP and/or BTPP) needed to actually pass the MVSS302 test and the TB 117 tests in a 1.8 density foam and the theoretical, predicted amount.

| Flame Retardant | MVSS 302 | Theoretical | TB 117 | Theoretical |
|---|---|---|---|---|
| 100% BTPP | 14 | 14 | 16 | 16.0 |
| 1 BTPP:1 PEEOP | 5 | 9 | 5 | 10.5 |
| 100% PEEOP | 4 | 4 | 5 | 5.0 |

The following additional data was obtained:

| SAMPLE | Total % P to pass TB117 | Total % P to pass MVSS302 | Density 1.8 (pcf) | Air Flow (ft³/min) |
|---|---|---|---|---|
| BTPP (Neat) | 1.36 | 1.19 | 1.82 | 4.2 |
| Blend: 1:1 | 0.69 | 0.69 | 1.79 | 4.1 |
| PEEOP (neat) | 0.95 | 0.76 | 1.85 | 6.0 |

At 1.5 and 1.8 foam density, blends (1:1) of the BTPP:PEEOP additives showed improvement over use of the neat BTPP. The blends passed the TB-117 test at 5 parts in a 1.8 foam whereas the neat BTPP material passed at 16 parts. The blend, while containing only 50% of the PEEOP component, is nearly as efficient as neat PEEOP (which passed at 5 parts in a 1.8 and 10 parts in a 1.5 density foam) but would be much cheaper to produce due to the amount of the cheaper BTPP material.

The 1:1 ratio of BTPP:PEEOP in a 1.8 density foam is of interest. The 1:1 ratio blend shows an advantage (pass: 5 parts in MVSS 302 test) over the use of the neat BTPP material (pass: 14 parts). It is also advantageous to use the 1:1 ratio material in 1.5 density foam. The BTPP-containing sample passes at about 15-16 parts, whereas the 1:1 ratio BTPP:PEEOP blend passes at 8 parts.

Data Set 4

This Data Set illustrates the flammability efficiency of other monomers and a dimer blended with PEEOP flame retardants at 1:1 ratios in a 1.8 pcf density foam:

| Flame Retardant | % P | TB117 (phr of FR) | % P to pass in foam | MVSS 302 (phr of FR) | % P to pass in foam |
|---|---|---|---|---|---|
| 1.8 pcf Density | | | | | |
| BTPP | 8.5 | 16 | 1.36 | 14 | 1.19 |
| BTPP/PEEOP | 13.8 | 5 | 0.69 | 5 | 0.69 |
| PHOSFLEX 31P/PEEOP | 13.5 | 7 | 0.94 | 4 | 0.54 |

| Flame Retardant | % P | TB117 (phr of FR) | % P to pass in foam | MVSS 302 (phr of FR) | % P to pass in foam |
|---|---|---|---|---|---|
| TPP/PEEOP | 14.3 | 7 | 1.00 | 4 | 0.57 |
| PHOSFLEX 4/PEEOP | 15.4 | 7 | 1.08 | 5 | 0.77 |
| PEEOP | 19 | 5 | 0.95 | 4 | 0.76 |
| RDP/PEEOP | 15 | 5 | 0.75 | 5 | 0.75 |

The foregoing Examples merely illustrate certain embodiments of the present invention and, for that reason should not be construed in a limiting sense. The scope of protection that is sought is set forth in the claims that follow.

We claim:

1. A polyurethane foam consisting essentially of a polyurethane foam and an effective amount for flame retardancy of a flame retardant blend consisting essentially of: (a) 50 percent by weight, of the blend, of butylated triphenyl phosphate and (b) 50 percent by weight, of the blend, of poly(ethylethyleneoxy) phosphate.

* * * * *